No. 630,555. Patented Aug. 8, 1899.
C. OETLING.
SPEED MEASURE.
(Application filed Jan. 22, 1898.)
(No Model.)
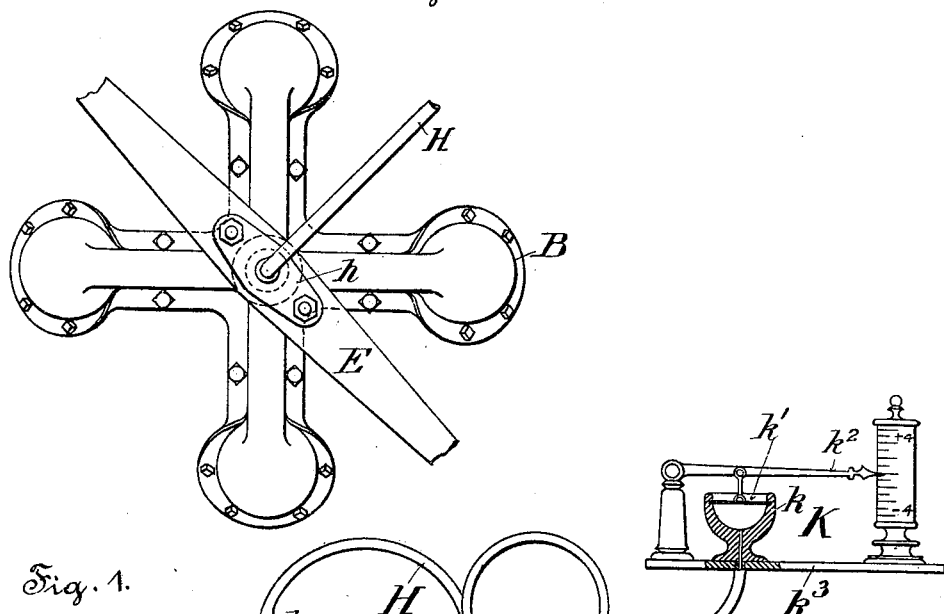
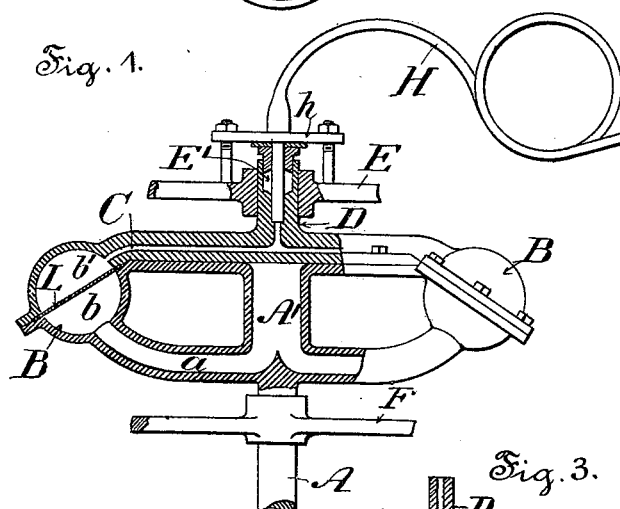
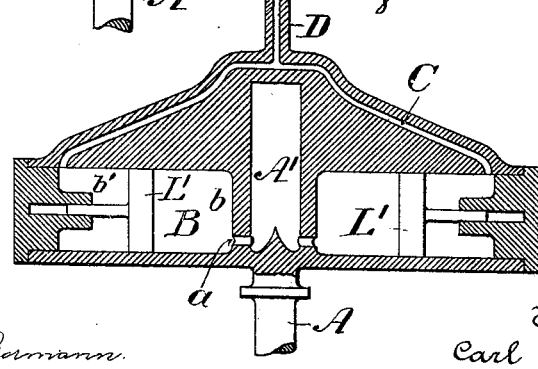
Witnesses:
Hermann W. Bormann.
C. Bormann.
Inventor:
Carl Oetling
By Hermann Bormann
Atty.

UNITED STATES PATENT OFFICE.

CARL OETLING, OF DRESDEN, GERMANY.

SPEED-MEASURE.

SPECIFICATION forming part of Letters Patent No. 630,555, dated August 8, 1899.

Application filed January 22, 1898. Serial No. 667,543. (No model.)

*To all whom it may concern:*

Be it known that I, CARL OETLING, a subject of the Emperor of Germany, residing at the city of Dresden, in the Kingdom of Saxony, Germany, have invented new and useful Apparatus for Regulating and Indicating Speed by the Centrifugal Force of Liquids, (for which I have obtained Letters Patent in Austria, No. 48/3,256, dated December 29, 1897; in Belgium, No. 132,794, dated December 29, 1897; in England, No. 30,674, dated December 28, 1897, and in France, No. 273,479, dated December 24, 1897,) of which the following is a specification.

My invention relates to improvements in apparatus for indicating rotary speed; and it consists of chambers fixed to a rotating shaft having a cavity. Each of the said chambers is divided into two compartments by a diaphragm or piston. One set of these compartments communicate with the cavity in the shaft and contain a heavy liquid, as mercury, and the other set of compartments beyond the diaphragm or piston contain a light liquid, as water, alcohol, &c., and these communicate with an indicating device of any preferred make; and the invention further consists of improvements hereinafter more fully described, and pointed out in the claims.

The invention will be more fully understood taken in connection with the accompanying drawings, forming part of this application, in which—

Figure 1 is a sectional elevation of a rotary speed-indicator having the chambers divided by diaphragms. Fig. 2 is a top view of the same, and Fig. 3 is a sectional elevation of a rotary speed-indicator having the chambers divided by pistons.

Referring now to the drawings for a further description of my invention, A is a driven shaft supported in bearings E and F and provided with a cavity A' at one end to contain a heavy liquid.

B are chambers communicating with the cavity A' of the shaft by the channels or passages $a$. These chambers B are divided by a diaphragm L, Fig. 1, or by a piston L', Fig. 3, into two compartments $b$ and $b'$. The compartments $b$ communicate with the cavity A' of the shaft A and the compartments $b'$ with an indicator K by means of passages or channels C and a tube H, attached to a cross-bar $h$, held to the bearing E by means of bolts. This cross-bar $h$ is fitted onto the nipple D of the cover containing the channels C by means of a stuffing-box E', so that the tube H is maintained stationary while the nipple D is rotating with the shaft A.

The operation of the speed-indicator is as follows: The shaft A whose rotary speed is to be measured is rotated and with the same the chambers B. The heavy liquid, as mercury, &c., is thrown or forced by centrifugal force against the diaphragms L or pistons L' and displaces the light liquid on the other side of the diaphragms L or pistons L'. The displaced light liquid is led to an indicator K of any preferred kind; but for the sake of illustration I have shown one of simple construction in Fig. 1, which consists of a receptacle $k$, with diaphragm $k'$. A pointer $k^2$ is hinged to the base $k^3$ and connected to the diaphragm $k'$ at about its center. The free end extends onto a graduated scale, and as the displaced light liquid bulges the diaphragm $k'$ upward the pointer $k^2$ is forced also upward and indicates the speed of the shaft. If the speed increases, the pointer moves farther upward, and when decreasing downward, as will be fully understood.

A great advantage of my improved speed-indicator is that the indicator proper can be set at a distance from the rotating shaft and the quantity of heavy liquid employed is reduced to a minimum.

Having thus described the nature and objects of my invention, what I claim as new, and desire to secure by Letters Patent, is—

1. A speed-indicator comprising a driven shaft, a cavity in the same, chambers arranged around said shaft, yielding partitions in said chambers to form two compartments in each chamber, passages from the cavity in the shaft to one of the two compartments of each chamber, passages from the other of the two compartments to a common point, a nipple at said point, and a tube leading to an indicator proper, substantially as and for the purposes set forth.

2. A speed-indicator comprising a driven shaft, a cavity in said shaft, chambers arranged around said shaft, yielding partitions in said chambers to form two compartments in each of the chambers, passages from the cavity in the shaft to one of the two compartments of each chamber, passages from the other of the two compartments to a common point, a nipple at said point and rotating with the said shaft and chambers, a cross-bar secured to a bearing of the shaft, a stuffing-box between said cross-bar and said nipple and an indicator proper, substantially as and for the purposes set forth.

Signed at Dresden, Germany, this 5th day of January, 1898.

CARL OETLING.

Witnesses:
HERNANDO DE SOTO,
PAUL ARRAS.